United States Patent
Nettis et al.

(10) Patent No.: US 9,644,791 B2
(45) Date of Patent: May 9, 2017

(54) SYSTEM AND METHOD FOR LOADING, STORING AND OFFLOADING NATURAL GAS FROM SHIPS

(75) Inventors: Francesco Nettis, London (GB); Darrell Hawkins, St. John's (CA); Christian Lena, Pegli (IT); Gianfranco Niso, Luxembourg (LU); Vanni Neri Tomaselli, Luxembourg (LU); Giorgio Vigna, Celle Ligure (IT)

(73) Assignee: Blue Wave Co S.A., Luxembourg (LU)

( * ) Notice: Subject to any disclaimer, the term of this patent is extended or adjusted under 35 U.S.C. 154(b) by 0 days.

(21) Appl. No.: 14/363,250

(22) PCT Filed: Dec. 5, 2011
(Under 37 CFR 1.47)

(86) PCT No.: PCT/EP2011/071802
§ 371 (c)(1),
(2), (4) Date: Jan. 23, 2015

(87) PCT Pub. No.: WO2013/083166
PCT Pub. Date: Jun. 13, 2013

(65) Prior Publication Data
US 2015/0176766 A1 Jun. 25, 2015

(51) Int. Cl.
*F17C 5/06* (2006.01)
(52) U.S. Cl.
CPC ........ *F17C 5/06* (2013.01); *F17C 2201/0109* (2013.01); *F17C 2201/032* (2013.01);
(Continued)
(58) Field of Classification Search
CPC ........ F17C 2201/0109; F17C 2201/032; F17C 2201/052; F17C 2203/0604;
(Continued)

(56) References Cited

U.S. PATENT DOCUMENTS 3,828,708 A * 8/1974 Gerwick et al. ............ 114/65 A
3,984,059 A * 10/1976 Davies .......................... 141/387
(Continued)

FOREIGN PATENT DOCUMENTS

| AU | 783 543 B2 | 11/2005 |
| DE | 23 37 673 A1 | 2/1975 |
| FR | 1.452.058 A | 9/1966 |

OTHER PUBLICATIONS

International Search Report issued Jan. 3, 2013, in PCT Application No. PCT/EP2011/071802, 4 pages.
(Continued)

*Primary Examiner* — Mark A Laurenzi
*Assistant Examiner* — Andrew Schmid
(74) *Attorney, Agent, or Firm* — Dorsey & Whitney LLP

(57) ABSTRACT

A system for loading and storing CNG onboard of a ship and for unloading it therefrom comprises CNG loading facilities for loading CNG on board of the ship, CNG storage facilities for storing the loaded CNG on board of the ship at nominal storage pressure and temperature, and CNG unloading facilities for unloading CNG to a delivery point. The delivery point requires the unloaded CNG to be at delivery pressure and temperature generally different from the storage pressure and temperature. Thus, the CNG unloading facilities comprise a CNG heater for heating the to-be-unloaded CNG prior to unloading, and a lamination valve for allowing the to-be-unloaded CNG to expand from its storage pressure to the delivery pressure. A compressor may also be provided to compress CNG that would not otherwise be spontaneously delivered.

23 Claims, 12 Drawing Sheets

(52) U.S. Cl.
CPC  *F17C 2201/052* (2013.01); *F17C 2203/0604* (2013.01); *F17C 2203/0614* (2013.01); *F17C 2203/0619* (2013.01); *F17C 2203/0636* (2013.01); *F17C 2203/0639* (2013.01); *F17C 2203/0646* (2013.01); *F17C 2203/0665* (2013.01); *F17C 2203/0673* (2013.01); *F17C 2205/013* (2013.01); *F17C 2205/0134* (2013.01); *F17C 2205/0146* (2013.01); *F17C 2205/035* (2013.01); *F17C 2205/0326* (2013.01); *F17C 2205/0332* (2013.01); *F17C 2205/0338* (2013.01); *F17C 2221/012* (2013.01); *F17C 2221/013* (2013.01); *F17C 2221/032* (2013.01); *F17C 2221/033* (2013.01); *F17C 2221/036* (2013.01); *F17C 2223/0123* (2013.01); *F17C 2223/035* (2013.01); *F17C 2223/036* (2013.01); *F17C 2225/0123* (2013.01); *F17C 2225/035* (2013.01); *F17C 2225/036* (2013.01); *F17C 2227/0164* (2013.01); *F17C 2227/0185* (2013.01); *F17C 2227/0318* (2013.01); *F17C 2227/0388* (2013.01); *F17C 2227/04* (2013.01); *F17C 2227/048* (2013.01); *F17C 2250/032* (2013.01); *F17C 2250/0408* (2013.01); *F17C 2260/025* (2013.01); *F17C 2260/042* (2013.01); *F17C 2260/056* (2013.01); *F17C 2265/061* (2013.01); *F17C 2265/07* (2013.01); *F17C 2270/0105* (2013.01); *Y02E 60/321* (2013.01)

(58) Field of Classification Search
CPC ...... F17C 2203/0614; F17C 2203/0619; F17C 2203/0636; F17C 2203/0646; F17C 2203/0665; F17C 2203/0673; F17C 2221/012; F17C 2221/013; F17C 2221/032; F17C 2221/033; F17C 2221/036; F17C 2223/0123; F17C 2223/035; F17C 2223/036; F17C 2227/0164; F17C 2227/0185; F17C 2227/0318; F17C 2227/0388; F17C 2227/04; F17C 2227/048; F17C 2250/032; F17C 2250/0408; F17C 2260/025; F17C 2260/042; F17C 2260/056; F17C 2265/061; F17C 2265/07; F17C 2270/0501

USPC .............................. 141/82; 62/53.2
See application file for complete search history.

(56) References Cited

U.S. PATENT DOCUMENTS

| | | | | |
|---|---|---|---|---|
| 4,846,088 | A * | 7/1989 | Fanse et al. | 114/72 |
| 5,502,266 | A * | 3/1996 | Hodson | 585/802 |
| 5,839,383 | A * | 11/1998 | Stenning et al. | 114/72 |
| 6,598,408 | B1 * | 7/2003 | Nierenberg | 62/53.2 |
| 7,240,498 | B1 * | 7/2007 | Shivers, III | 62/53.2 |
| 7,322,387 | B2 * | 1/2008 | Landry et al. | 141/382 |
| 2002/0046547 | A1 * | 4/2002 | Bishop et al. | 53/403 |
| 2002/0174662 | A1 * | 11/2002 | Frimm et al. | 62/50.2 |
| 2004/0060497 | A1 * | 4/2004 | Smith et al. | 114/74 R |
| 2005/0206239 | A1 * | 9/2005 | Poldervaart et al. | 307/9.1 |
| 2006/0010911 | A1 * | 1/2006 | Hubbard et al. | 62/611 |
| 2006/0180231 | A1 * | 8/2006 | Harland et al. | 141/1 |
| 2007/0014636 | A1 * | 1/2007 | Breivik et al. | 405/171 |
| 2007/0017575 | A1 * | 1/2007 | Hall et al. | 137/247 |
| 2008/0047280 | A1 * | 2/2008 | Dubar | 62/50.2 |
| 2008/0127673 | A1 * | 6/2008 | Bowen et al. | 62/611 |
| 2008/0209916 | A1 * | 9/2008 | White | 62/48.1 |
| 2010/0000252 | A1 * | 1/2010 | Morris et al. | 62/611 |
| 2010/0050925 | A1 * | 3/2010 | Donnelly et al. | 114/74 R |
| 2010/0074692 | A1 * | 3/2010 | Ehrhardt et al. | 405/203 |
| 2010/0175884 | A1 * | 7/2010 | Poldervaart et al. | 166/352 |
| 2010/0199904 | A1 * | 8/2010 | Levander | 114/40 |
| 2011/0030391 | A1 * | 2/2011 | Faka | 62/50.2 |
| 2011/0182698 | A1 * | 7/2011 | Foo et al. | 414/137.5 |
| 2012/0137955 | A1 * | 6/2012 | Van Tassel | 114/74 R |
| 2013/0192510 | A1 * | 8/2013 | Jang et al. | 114/74 R |
| 2014/0224169 | A1 * | 8/2014 | Morimoto | 114/74 R |
| 2014/0290281 | A1 * | 10/2014 | Waller | 62/53.2 |
| 2014/0299039 | A1 * | 10/2014 | Trollux | 114/74 R |
| 2014/0331691 | A1 * | 11/2014 | Nettis et al. | 62/53.2 |
| 2014/0369765 | A1 * | 12/2014 | Fargier et al. | 405/224 |
| 2015/0128844 | A1 * | 5/2015 | Nettis et al. | 114/74 R |
| 2015/0135733 | A1 * | 5/2015 | Nettis et al. | 62/53.2 |
| 2015/0176766 | A1 * | 6/2015 | Nettis et al. | 141/1 |

OTHER PUBLICATIONS

Written Opinion issued Jan. 3, 2013, in PCT Application No. PCT/EP2011/071802, 6 pages.
International Preliminary Report on Patentability issued Jun. 10, 2014, in PCT Application No. PCT/EP2011/071802, 7 pages.

* cited by examiner

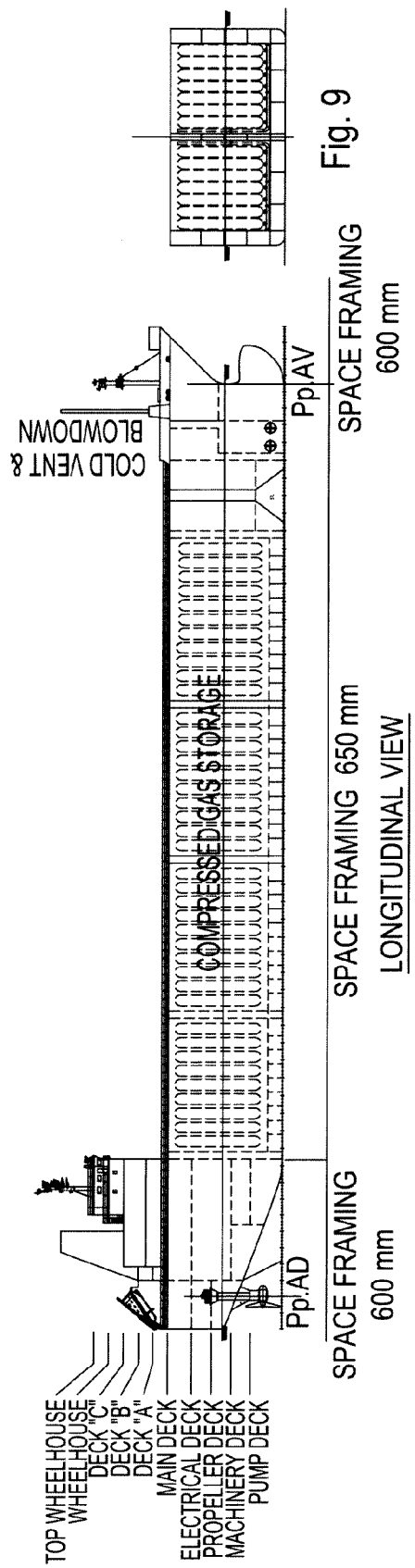
Fig. 9
Fig. 8
LONGITUDINAL VIEW
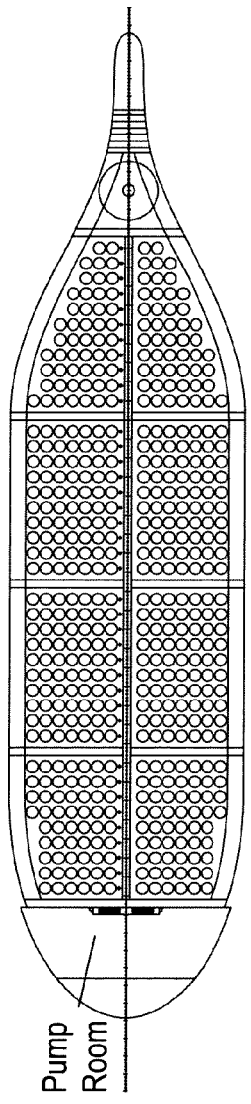
Fig. 10

LONGITUDINAL VIEW

TOP DOUBLE BOTTOM AT 2340 mm FROM B.L.

Elevation

Top View

Section 2-2

Section 1-1

SYSTEM AND METHOD FOR LOADING, STORING AND OFFLOADING NATURAL GAS FROM SHIPS

CROSS-REFERENCE TO RELATED APPLICATIONS

This application is a national stage application under 35 U.S.C. §371 of International Application No. PCT/EP2011/071802, filed Dec. 5, 2011, entitled "System and Method for Loading, Storing and Offloading Natural Gas From Ships," the contents of which are hereby incorporated herein in their entirety by reference for all purposes.

TECHNICAL FIELD

The present invention relates to transportation of natural gas on ships. The present invention provides a system and a method for loading natural gas on the ships, storing it thereon, and for offloading the natural gas from the ships at a delivery point. In particular, the present invention relates to a system and a method for loading, transporting and offloading natural gas in the form of Compressed Natural Gas (CNG) on and from the ships.

BACKGROUND

Natural gas sourced offshore from underwater natural gas wells can be transported by carrier ships as an alternative to transportation using underwater pipelines. One manner of transporting natural gas is in the form of Liquid Natural Gas (LNG), and another form of transportation is Compressed Natural Gas (CNG).

With LNG, it is necessary to cool the gas down to very low temperatures in order to liquefy the gas. The gas is then re-gasified prior to delivery. Moderate pressures are involved in storing LNG in tanks on the ships during transportation, e.g. 20 bar or less. With CNG, instead the gas is simply compressed to high pressures, of the order of hundreds of bars, and transported inside suitable pressure vessels, such as steel or composite pressure vessels, on the ships. The gas is then allowed to expand at the delivery point, so that it can be delivered at a lower delivery pressure.

Existing naval CNG transportation systems and methods are known to have some disadvantages, such as a) low loading and unloading efficiencies (the loading and unloading efficiency is quantified by the ratio between the total energy or mass of CNG delivered at the delivery point by the ship, to the total energy or mass of CNG loaded at the loading point in the ship); b) risks connected with the formation of hydrates upon delivery in the delivered CNG, such as a poorer product (i.e. lower calorific value), and/or formation of ice, which is known to be able to cause structural damage to the CNG delivery equipment.

SUMMARY

It is desirable to improve the loading/unloading efficiency of the ships.

The energy that is not delivered at the delivery point either remains stored in the ship in the form of residual CNG, or is consumed during the loading and offloading operations.

It is also desirable to reduce or eliminate the formation of hydrates in the CNG during unloading of the CNG.

According to a first aspect of the present invention there is provided a system for loading and storing CNG onboard a ship and for unloading CNG therefrom, the system comprising:

CNG loading facilities for loading CNG on board of the ship;

CNG storage facilities for storing the loaded CNG onboard the ship at storage pressures and temperatures;

CNG unloading facilities for unloading CNG to a delivery point, the delivery point requiring the unloaded CNG to be at delivery pressures and temperatures generally different from the storage pressures and temperatures, wherein the CNG unloading facilities comprise:

a CNG heater for heating the to-be-unloaded CNG prior to unloading;

a lamination valve for allowing the to-be-unloaded CNG to expand from the storage pressure to the delivery pressure prior to unloading.

According to a second aspect of the invention, there is provided a method for loading and storing CNG onboard a ship and for unloading CNG therefrom, the method comprising the sequential steps of:

loading CNG onboard a ship;

storing the loaded CNG onboard the ship for transportation purposes at a range of storage pressures and temperatures; and unloading the to-be-unloaded CNG from the ship to a delivery point, the delivery pressures and temperatures of the unloaded CNG being a range that is generally different from the range of storage pressures and temperatures, wherein the step of unloading the to-be-unloaded CNG from the ship comprises the steps of:

heating the to-be-unloaded CNG prior to unloading; and allowing the then heated, to-be-unloaded CNG to expand freely through a lamination valve whereby the to-be-unloaded CNG can be delivered at the delivery point at the delivery pressure and temperature.

According to a further aspect of the invention there is provided a CNG carrier ship comprising a system according to the first aspect of the invention.

According to a further aspect of the invention there is provided a CNG carrier barge comprising a system according to the first aspect of the invention. A barge in this context is a non-motorised sea faring carrier vessel.

Further advantageous features of the present invention are identified in the dependent claims.

BRIEF DESCRIPTION OF THE FIGURES

The present invention will now be described, purely by way of example, with reference to the accompanying drawings in which:

FIGS. 8 to 10 schematically illustrate a CNG carrier ship featuring a plurality of all-steel pressure vessels;

In FIGS. 1, 2 and 5, the following line styles are used:
- solid lines to represent "process lines", i.e. pipelines or pipe networks used for streaming CNG at predetermined pressure and temperature conditions;
- dashed lines to represent "electric signals", i.e. cabling or cable networks used for carrying electric actuation signals;
- dashed lines to represent, in a mechanical context, "flexible mechanical connections", such as flexible pipelines or pipes;
- long-dash/short-dash lines to represent "facilities located onboard of a CNG carrier ship";
- solid lines with "L" symbols to represent "hydraulic signal lines", i.e. cables carrying actuation signals in the form of liquid pressure;
- solid lines with "//" symbols to represent "pneumatic signal lines", i.e. cables carrying actuation signals in the form of air pressure;
- solid or dashed lines with "~" symbols to represent "omitted or interrupted lines", which substitute redundant technical information for representation purposes;
- solid lines with "=" symbols to represent "pipeline end plates" or "pipeline flanged terminations";
- solid lines with "N" symbols to represent "connections between distinct pipeline sections", for example sections belonging to different stream numbers (see below for definition of stream numbers or stream sections);
- solid lines with transversal "I" symbols to represent "pipeline joints" between different sections of pipelines, or between pipelines and other facilities or machinery such as compressors, heat exchangers, pressure vessel units etc.; and
- lines ending with an arrow to represent "CNG flow directions".

In FIGS. 4 and 7, the following line styles are used:
- thin solid lines to represent flow lines operative during both loading and unloading phase;
- thick solid lines to represent flow lines operative only during spontaneous delivery of CNG during the unloading phase (see below for meaning of spontaneous delivery); and
- thick dashed lines to represent flow lines operative only during delivery with compression during the unloading phase.

DETAILED DESCRIPTION

Figure 1:
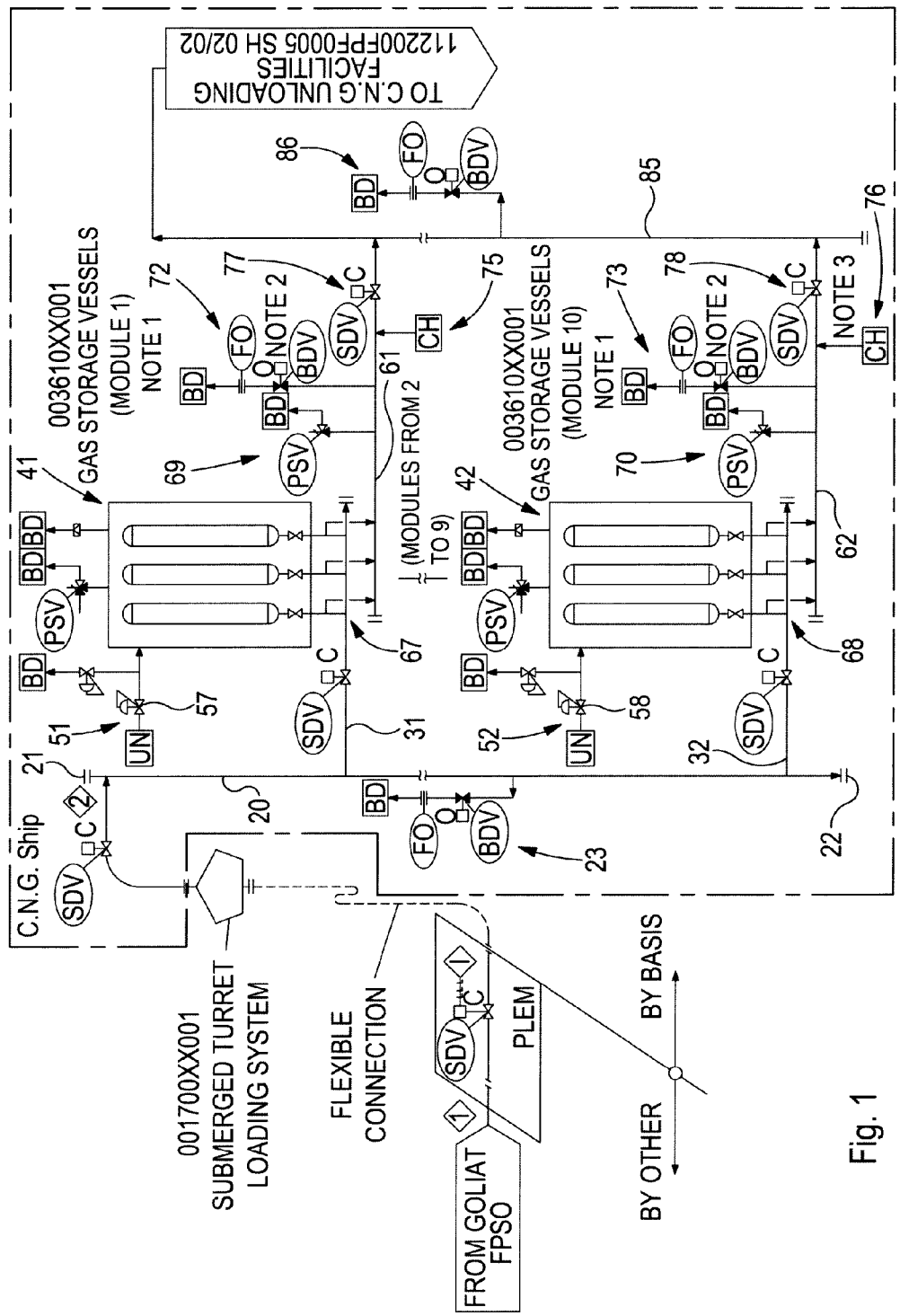
FIG. 1 is a flow-chart representing an arrangement of loading and storage facilities onboard of a CNG carrier ship according to an embodiment of the present invention.

In the Figures and in the description, the following abbreviations and/or reference symbols are used:
- barg="bar gauge", an unit denoting pressure relatively to atmospheric value. It is given by absolute pressure minus atmospheric pressure (nominally taken to be 1 bar)
- FPSO="Floating Production, Storage and Offloading Unit"
- SDV="Shut Down and Control Generic Valve System"
- PLEM="System for Measuring Gas Properties"
- STLS="Submerged Turret Loading System"
- C="Failure-Close Valve"
- O="Failure-Open Valve"
- BDV="Blow-Down Valve"
- BD="Blow-Down Piping System"
- UN="Inert Gas Supply System" (usually, the inert gas is nitrogen)
- FO="Calibrated Orifice"
- PSV="Pressure Safety Valve"
- CH="Chemical Injection System" (usually, the chemical is methanol)
- UV="Blockage Valve"
- DR="Drainage Piping System"
- FG="Fuel Gas Supply System" or "Fuel Gas"
- HW="Hot Water Injection System"
- SW="Sea Water Injection System"
- TV="Temperature Controlled Valve"
- FV="Flow Controlled Valve"; in one instance this is also the main expansion valve, or main lamination valve, i.e. a valve separating an upstream flow of CNG at higher pressures (e.g. 230 barg) and a downstream flow of CNG at lower pressures (e.g. 210 barg)
- FC="Flow Control Unit"
- PC="Pressure Control Unit"
- HIPPS="High Integrity Pipeline Protection System"
- TC="Temperature Control Unit"
- LV="Level Controlled Valve"
- LC="Level Control Unit or System"
- Arabic numerals inside a diamond symbol denote the "Stream Number" or "Stream Section". The stream number and the stream section identify a path or route of CNG wherein the pressure and temperature conditions of the CNG are generally unchanged.
- I="Intelligent Controller"
- UNIT 120="Chemical Injection Module"
- UNIT 170="Gas Sealine Module (also referred to as "Gas Loading and Unloading Facility")—this unit is located in the ship's hold, and provides the input/output interface of the ship for loading and unloading of CNG
- UNIT 230="Flare, Vent and Blow-Down System"
- UNIT 300="Gas Separation and Heating Unit"
- UNIT 360="Gas Compression Unit for Scavenging". In this application Energy Scavenging refers to the recovery of CNG from the pressure vessels that otherwise would not be recovered and delivered.
- UNIT 361="Compressed Gas Storage Facilities" (also located in the ship's hold)
- UNIT 410="Hot Water Facility"
- UNIT 420="Fuel Gas Supply Unit"
- UNIT 430="Diesel Fuel Unit"
- UNIT 460="Compressed Air Facility"
- UNIT 470="Main Electric Power Generator"
- UNIT 480="Emergency Electric Power Generator"
- UNIT 550="Closed Drains"
- UNIT 600="Inert Gas (Nitrogen) Supply Unit"
- AA="Air"
- DC="Closed Drain System"

FIGS. 1 to 4 relate to a first case study involving operations of loading, storage, transportation and unloading of CNG respectively on and from CNG carrier ships related to an offshore natural gas production site in Northern Europe. The delivery destination in this first case study is also in Northern Europe, and is referred to for simplicity as location "K". The K delivery point accepts CNG at temperatures around 10 degrees C. and pressures in the order of 110-120 bar.

FIGS. 1, 5, 6 and 7 relate to a second case study also involving operations of loading, storage, transportation and unloading of CNG respectively on and from CNG carrier ships also related to a natural gas production site in Northern Europe. The delivery destination in this second case study is different from the one in the first case study, although it too is in Northern Europe. This second delivery destination is referred to as location "B" for simplicity. The B delivery point accepts CNG at temperatures around 20 degrees C. and pressures in the order of 110-120 bar. B accepts, therefore, slightly hotter CNG than K. K and B have been taken here as examples, but different delivery locations may exist, and the pressure and temperature requirements at different delivery locations may change considerably, e.g. depending upon local custom or energy provider requirements.

FIG. 1, which is a flow chart representing the CNG loading phase, is representative of both the first and second case studies. In other words, the CNG loading phase is practically the same for the K and B cases.

Figure 3:
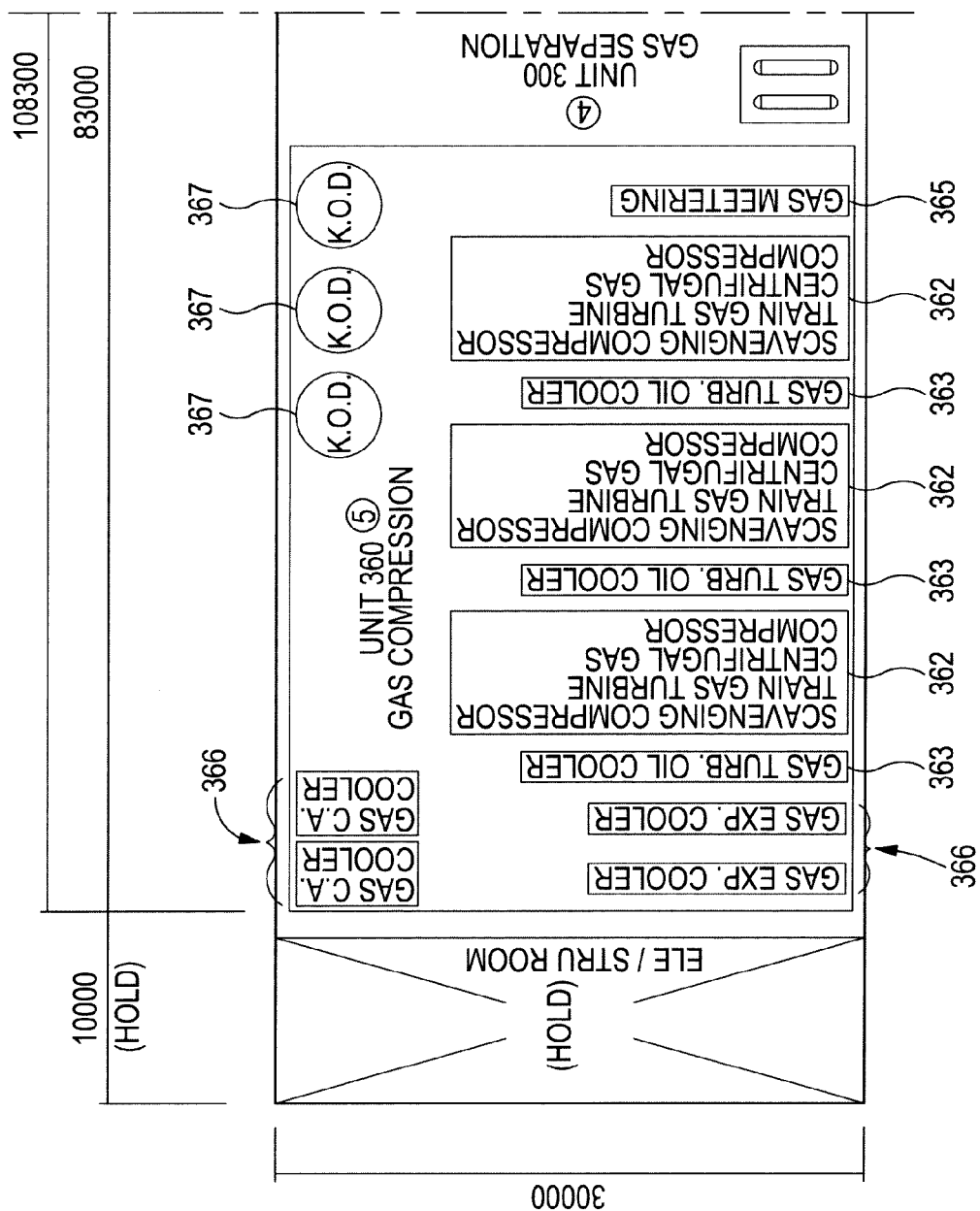
FIG. 3 is a schematic plan view of a CNG carrier ship in accordance with an embodiment of the present invention comprising features from FIGS. 1 and 2.
Figure 3:
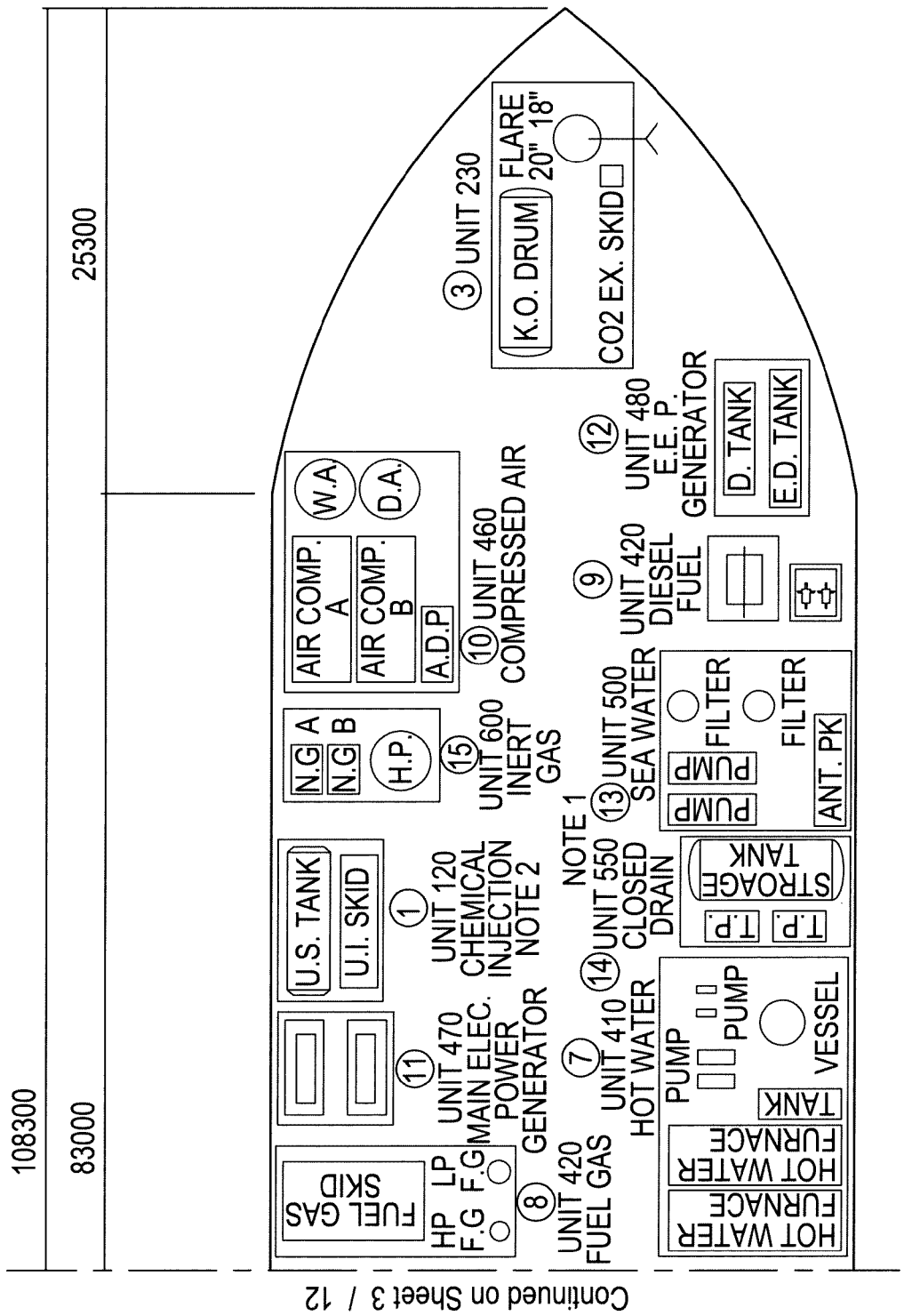
Figure 6:
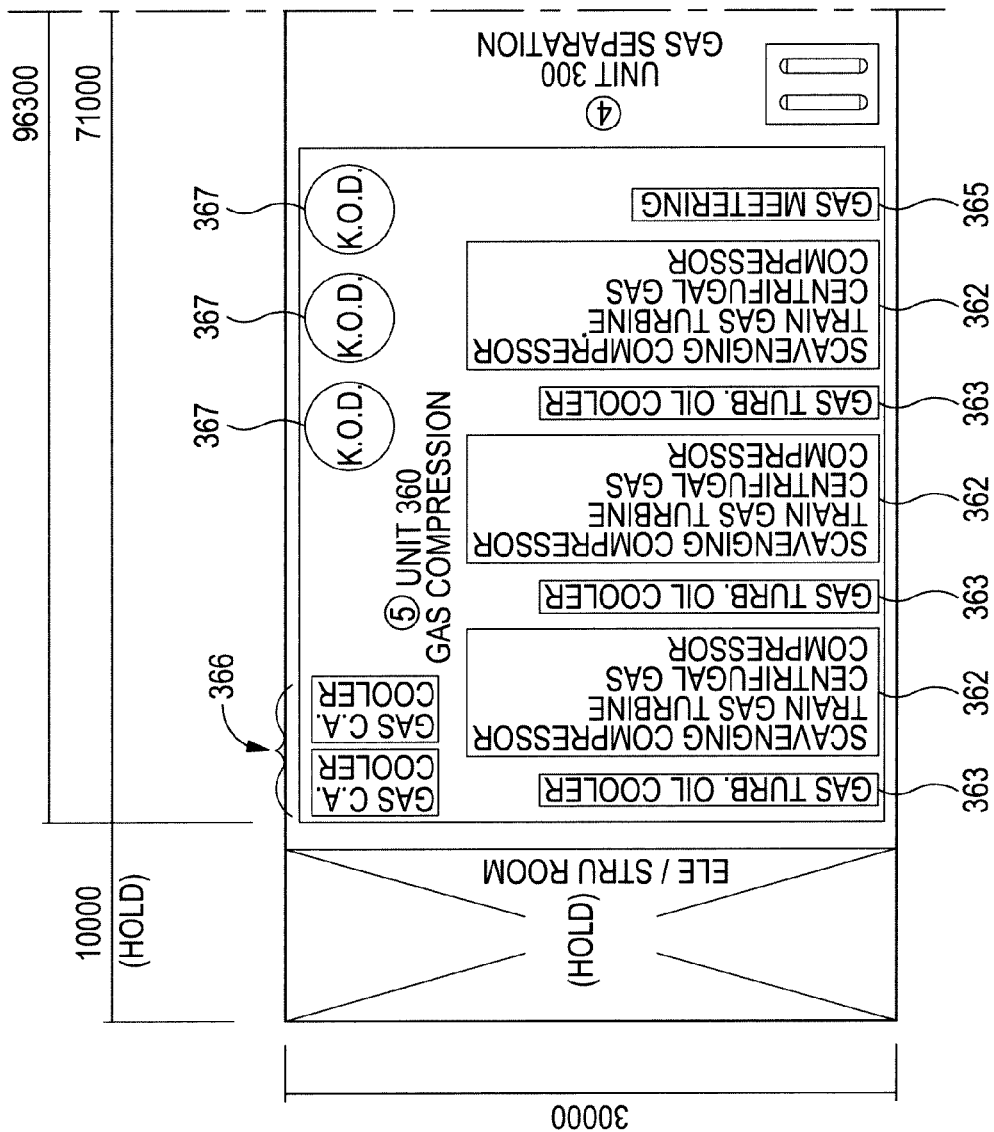
FIG. 6 is a schematic plan view of a CNG carrier ship in accordance with an embodiment of the present invention comprising features from FIGS. 1 and 5.
Figure 6:
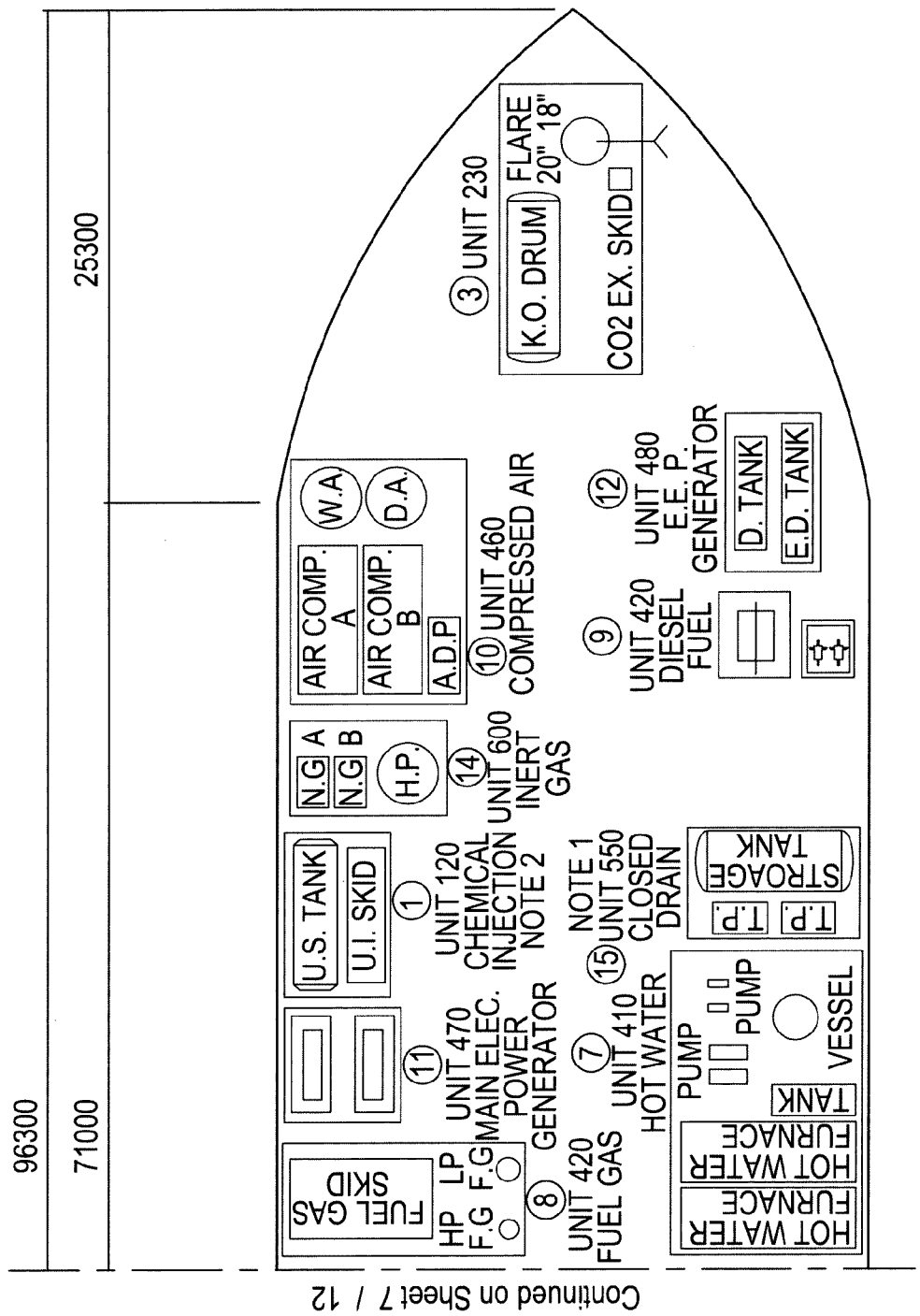

FIGS. 3 and 6 represent respectively ship facility lay outs for the K and B cases. There are differences between FIGS. 3 and 6. However, these differences are minimal and they will be briefly discussed below.

Figure 2:
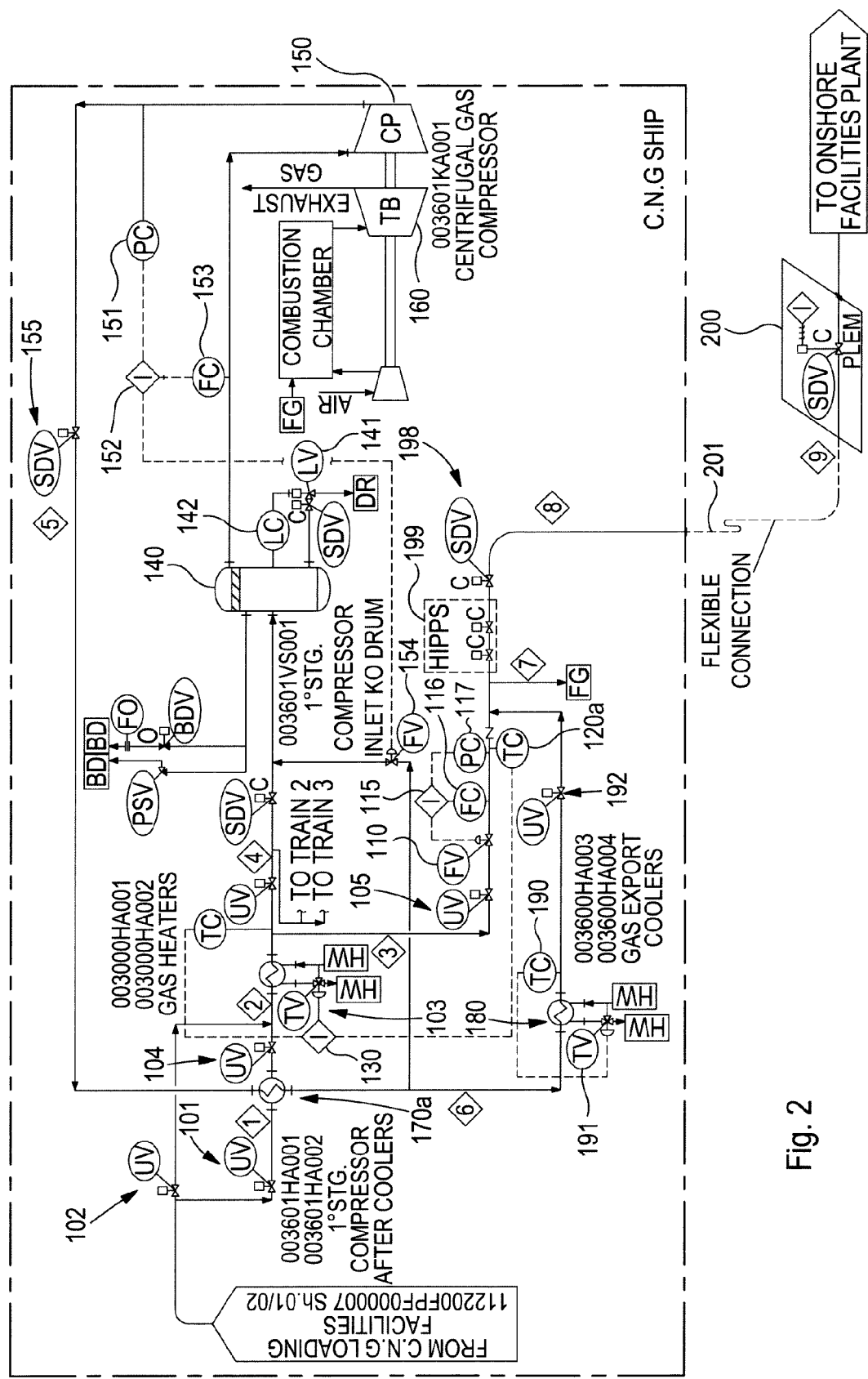
FIG. 2 is a flow-chart representing an arrangement of unloading facilities onboard of a CNG carrier ship according to an embodiment of the present invention.
Figure 4:
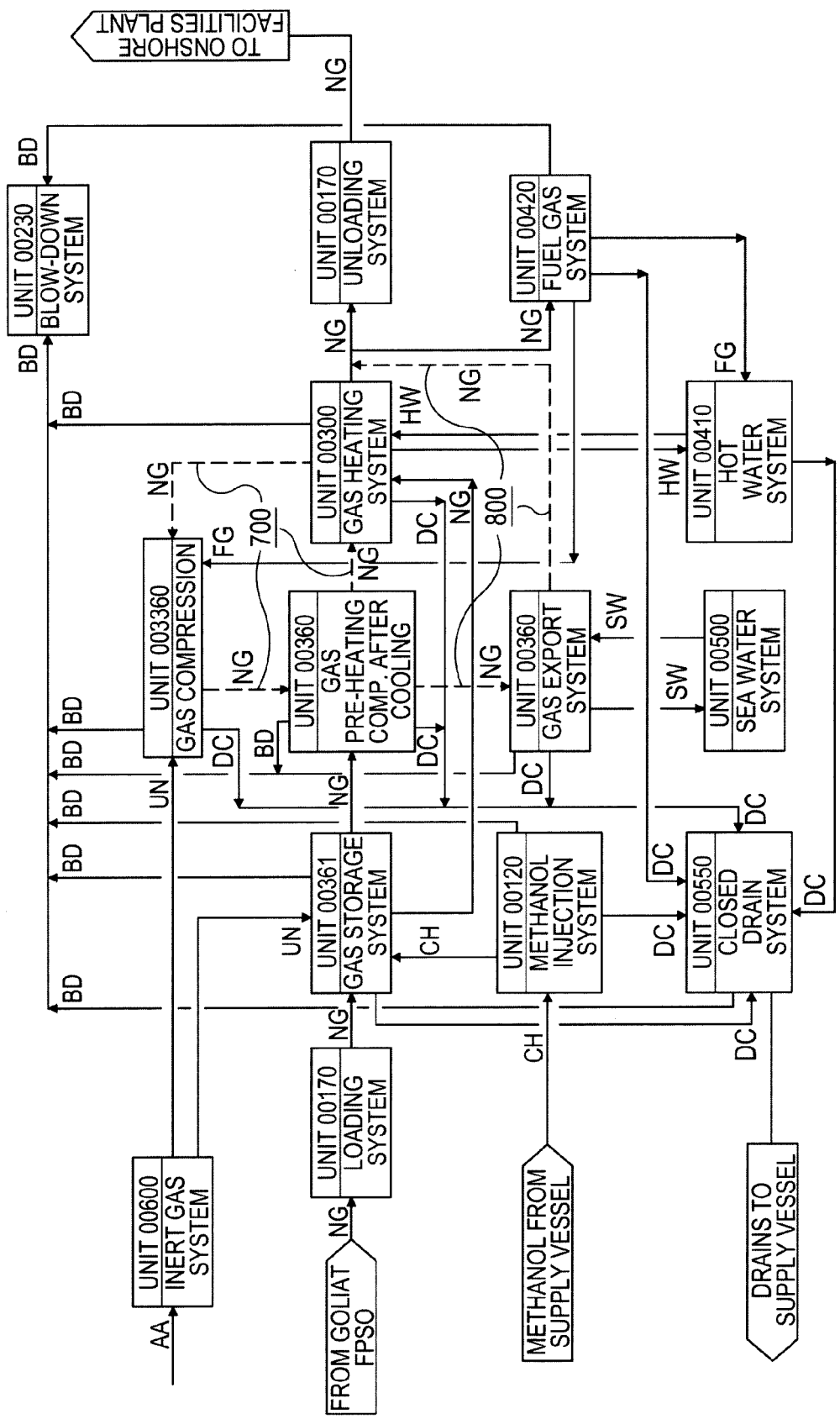
FIG. 4 is a block logic diagram showing loading and unloading operations in accordance with an embodiment comprising features from FIGS. 1, 2 and 3.
Figure 5:
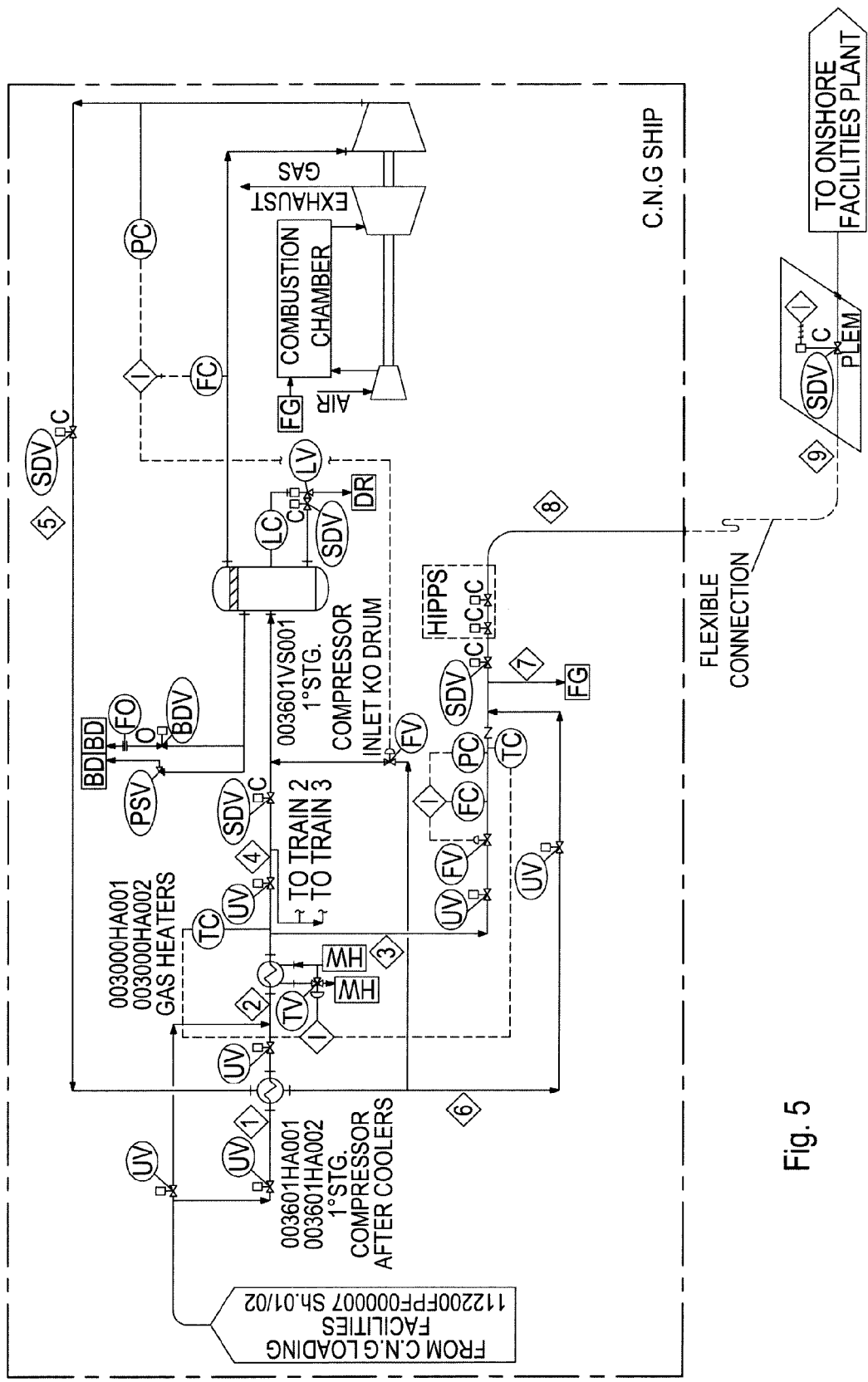
FIG. 5 is a flow-chart representing an arrangement of unloading facilities onboard of a CNG carrier ship according to another embodiment of the invention.
Figure 7:
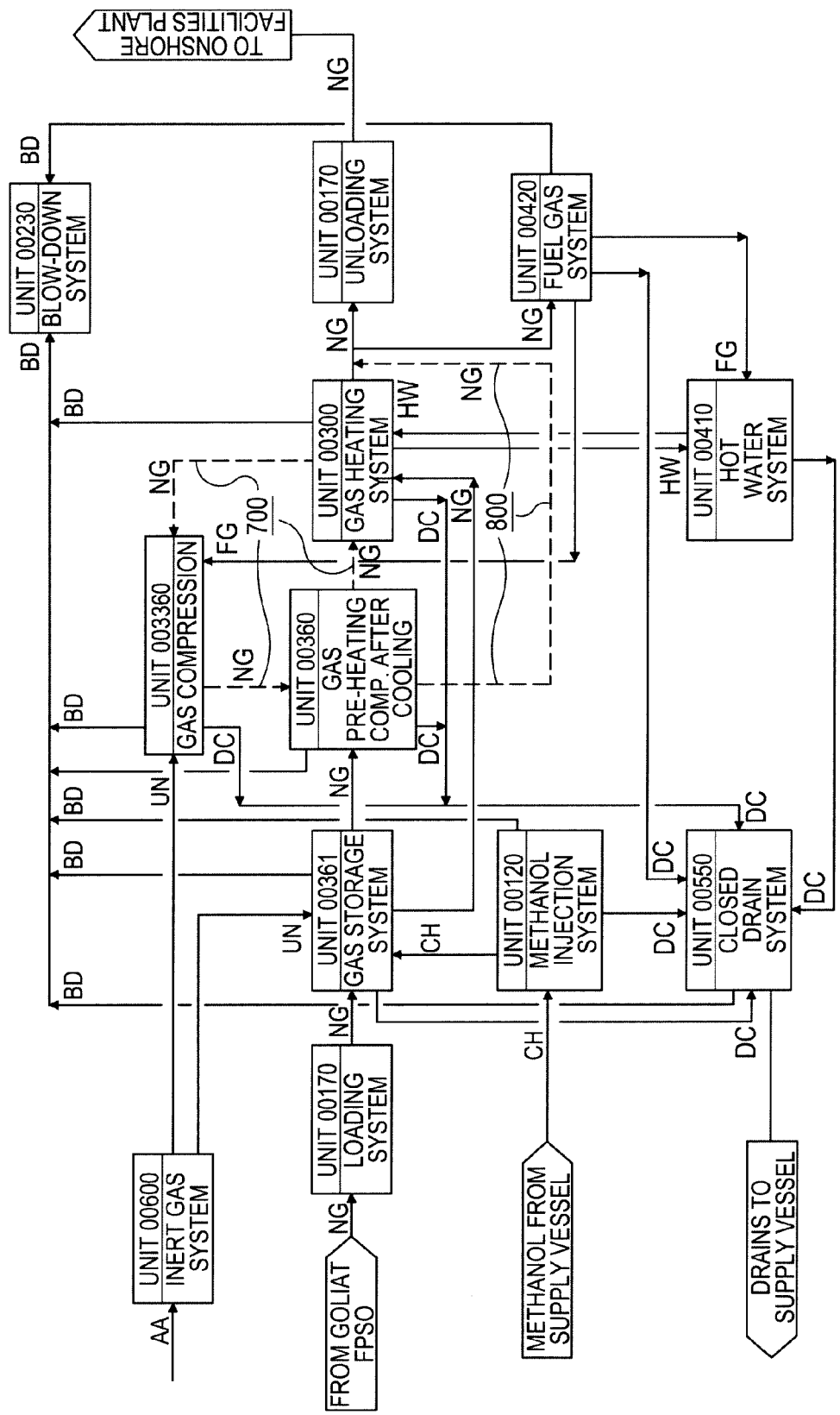
FIG. 7 is a block logic diagram showing loading and unloading operations in accordance with an embodiment comprising features from FIGS. 1, 5 and 6.
Figure 12:
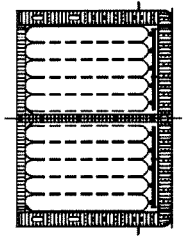
FIGS. 11 to 13 schematically illustrate a CNG carrier ship featuring a plurality of composite pressure vessels, e.g. type 3 or type 4—such vessels can have a larger diameter, and they might be longer.
Figure 11:
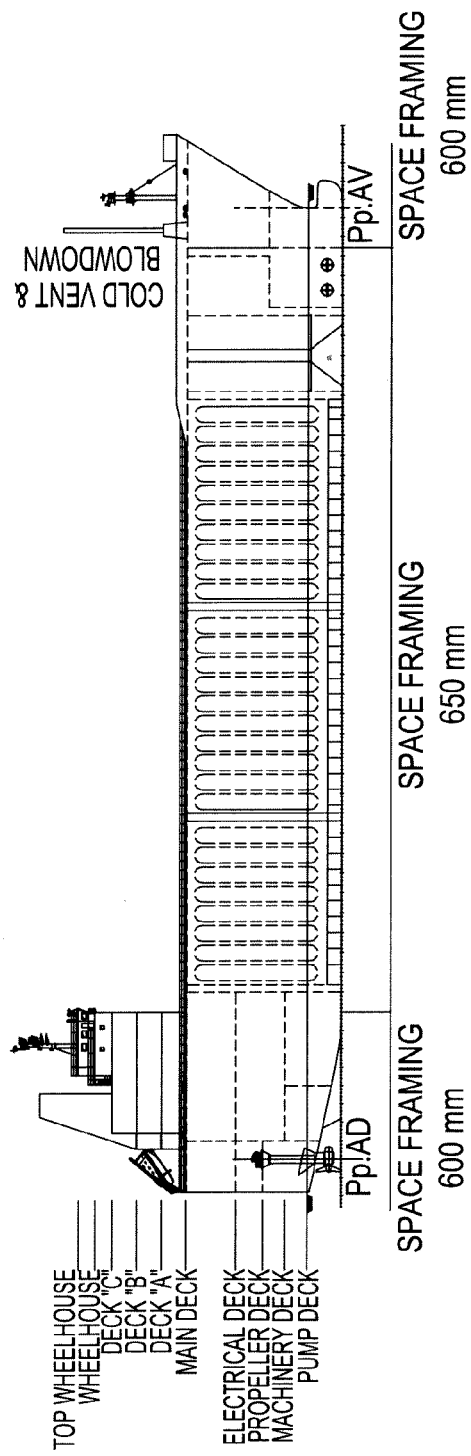
Figure 13:
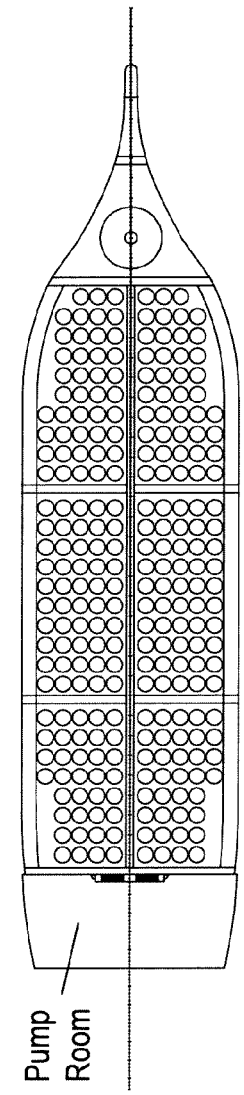
Figure 14:
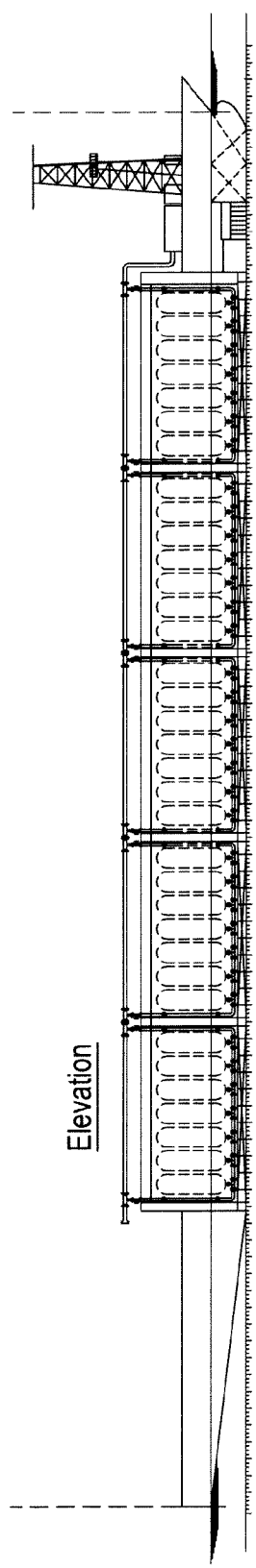
FIGS. 14 to 17 schematically illustrate a CNG carrier barge featuring a plurality of composite pressure vessels, e.g. type 3 or type 4.
Figure 15:
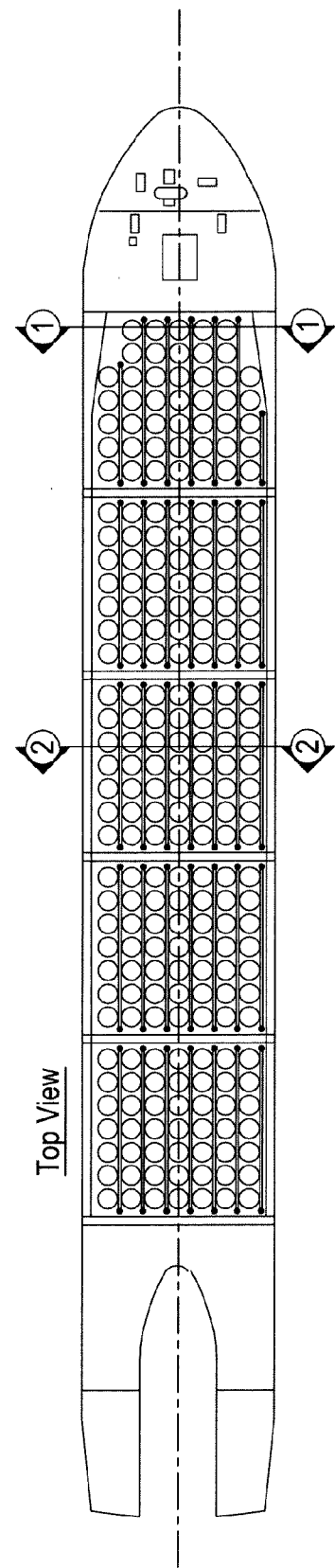
Figure 17:
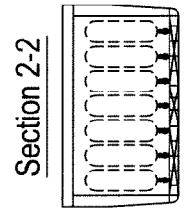
Figure 16:
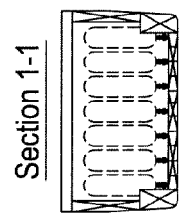

FIGS. 2, 4, 5 and 7 illustrate for respectively the K and B cases, how the CNG is handled on the ships in preparation for, and during, offloading of the CNG at the K and B delivery points. There is a difference between the CNG unloading phases in the K and B cases—this difference will be described in detail below. The difference, which is imposed by the different CNG delivery conditions at the K and B delivery points, and which is basically one missing cooler from FIGS. 5 and 7 compared to FIGS. 2 and 4, is clearly visible from a comparison of those Figures.

Natural gas might be extracted from underwater wells and, from those wells, it is first stored in a Floating Production Storage and Offloading unit FPSO (see FIG. 1). At the FPSO, the natural gas is treated and stored at the nominal transportation pressure, for example 230 barg (high pressure), and then loaded and stored into CNG carrier containment system (pressure vessels) at the same high pressure value. By contrast, the pressure of residual CNG contained in pressure vessels on CNG carrier ships about to load CNG from the FPSO is around 30 barg (low pressure).

Before being loaded onto the CNG carrier ship, the physical and chemical properties of the natural gas are measured at a PLEM station (see FIG. 1). The PLEM station has a system of valves SDV for regulating the flow of CNG therethrough. The valve system SDV comprises a fail-close valve C, and is controlled by a controller I which communicates hydraulically with valve C.

CNG stream 1, for both the K and B cases, is at approximately 230 barg and at a temperature value depending on gas treatment present on FPSO. For example, it may be 15° C. As explained above, the CNG is delivered to the ships already pre-compressed and pre-treated. Pre-compression and pre-treatment take place on the FPSO.

According to FIG. 1, via the PLEM station, the CNG is delivered to a submerged turret loading system STLS (the system is hosted on a buoyant structure) by means of a flexible mechanical connection such as a flexible pipe. The submerged turret loading system STLS operates as an interface unit for the CNG carrier ship. The CNG is loaded onto the ship from the STLS. A mains shutter valve system SDV comprising a fail-close valve C is provided on the ship, downstream of the entry point of the CNG in the ship, to block ingress of CNG in the ship, if necessary, for safety reasons. CNG stream 2 in FIG. 1 is about at the same conditions as the gas of stream 1, e.g. also at around 230 barg and 15 degrees C.—this is due to the fact that the CNG has not yet undergone any thermodynamic transformation on the ship.

On the ships, a storage system is provided for storing the loaded CNG. The storage system can consist of pressure vessels grouped in hold spaces (modules) for safety reasons. For example, the CNG carrier ships might have 8 storage modules, and each module might have 70 pressure vessels (PVs). That might in particular be suitable for steel PVs. With composite PVs, there might be fewer, since they might be larger. For example there might be 6 modules and 50 PVs for each module.

Each module can be divided into sealed compartments, and each compartment can comprises 70 steel PVs or 50 composite PVs, or other numbers, e.g. 60 and 10—the number of modules, compartments in each module and PVs in each compartment can vary, as it will be recognised by the skilled person.

9 PVs per compartment are also possible, and these can be grouped three by three.

The storage system of PVs is supplied by a loading distribution network of pipes 20, as shown in FIG. 1. The loading distribution network of pipes 20 is drawn vertically in FIG. 1, and it is delimited by end flanged termination 21, 22. The loading distribution network is connected to a safety blow-down system 23 which comprises a blow down valve BDV with relative, safety fail-open valve O. The blow down valve BDV is connected to a blow down pipe network BD. The blow-down pipe network is eventually connected to a flare on the ship. The blow down system is used in emergencies, e.g. if pressures above any allowed limits are reached in CNG stream section 2 for any reasons.

Individual module supply pipes 31, 32 connect the distribution piping network 20 with each of the modules 41, 42. Other modules are present in the ship, as discussed above, but in FIG. 1 for representation purposes only two modules 41, 42 are shown.

Each supply pipe 31, 32 has its own shut-down and control valve system SDV, and each valve system SDV comprises its fail-close valve C. In this manner, each module 41, 42 can be isolated upstream from the remainder of the system when necessary.

Pressure vessels for the transport of compressed fluids presently constitute four regulatory agency approved classes or types, all of which are cylindrical with one or two domed ends:

Type I. Consists of an all metal, usually aluminum or steel, construct. This type of vessel is inexpensive but is very heavy in relation to the other classes of vessels. The entire vessel is of sufficient strength to withstand the intended pressure exerted on the vessel by a contained compressed fluid and therefore does not require any manner of strength-enhancing over-wrap, including the dry filamentous over-wrap of this invention. Type I pressure vessels currently comprise a large portion of the containers used to ship compressed fluids by sea, their use in marine transport incurs very tight economic constraints.

Type II. Consists of a thinner metal cylindrical center section with standard thickness metal end domes such that only the cylindrical portion need be reinforced, currently with a composite over-wrap. The composite wrap generally constitutes glass or carbon filament impregnated with a polymer matrix. The composite is usually "hoop wrapped"

around the middle of the vessel. The domes at one or both ends of the vessel are of sufficient strength to withstand the pressures developed in the vessel under normal use and are not composite wrapped. In type II pressure vessels, the metal liner carries about 50% of the stress and the composite carries about 50% of the stress resulting from the internal pressure of the contained compressed fluid. Type II vessels are lighter than type I vessels but are more expensive.

Type III. Consists of a thin metal liner that comprises the entire structure, that is, the cylindrical center section and the end dome(s). Thus, the liner is currently reinforced with a filamentous composite wrap around entire vessel. The stress in Type III vessels is shifted virtually entirely to the filamentous material of the composite wrap; the liner need only withstand a small portion of the stress. Type III vessels are much lighter than type I or II vessels but are substantially more expensive.

Type IV. Consists of a polymeric, essentially gas-tight liner that comprises both the cylindrical center section and the dome(s), all of which is currently fully wrapped with a filamentous composite. The composite wrap provides the entire strength of the vessel. Type IV vessels are by far the lightest of the four approved classes of pressure vessels but are also the most expensive.

As noted above, Type II, III and IV pressure vessel currently require a composite over-wrap over a vessel liner to give them the necessary strength to withstand the intended pressure exerted by a compressed fluid contained in the vessel. It is known, however, that the polymeric matrix of the composite wrap adds little or no strength to the over-wrap. Thus, this invention also can be used with novel winding arrangements using a dry filamentous material that is disposed over a pressure vessel liner in a dry state and that is remains in essentially a dry state (i.e. not bonded throughout with an impregnation of resin) for the life-time of the pressure vessel.

"Essentially" in a dry state takes into consideration that, in use, particularly for marine transport of compressed fluids, the filamentous material may inadvertently become dampened by environmental moisture and the like. That is, the dry filamentous material is intended to be disposed over the vessel dry and to be dry when the vessel is put in use. Essentially dry in this context therefore does not exclude situations where the filaments/fibres are wetted by water.

Considering now individually the modules 41, 42, each module is connected to an inert gas system UN 51, 52 which can supply the module with an inert gas (e.g. nitrogen). The inert gas systems are controlled by respective automatic control valves 57, 58 which can be activated as a function of the value of pressures measured in the modules. If the pressure in any of the compartments of the modules increases, this could mean that CNG is leaking from the PVs in the compartment. The inert gas systems UN 51, 52 allow an oxygen-scarce atmosphere to be maintained in the compartments, in order to prevent any potential combustion. In other words, the inert gas systems UN 51, 52 serve to "control" the atmosphere in the modules.

When CNG is present in any of the compartments in a measured quantity above a predetermined value, e.g. exceeding a given number of parts per million, the corresponding automatic control valve 57, 58 opens and allows inert gas UN to flow through the inert gas system 51, 52 and into the module and compartment.

For safety reasons, each inert system UN 51, 52 is equipped with a safety blow-down system so as to allow any excess inert gas to be ejected from the inert gas systems when necessary.

Each module 41, 42 is air sealed in respect of the outer environment. The internal atmosphere in each module is controlled by the possibility of admitting an inert gas into the module, i.e. a gas not capable of sustaining a combustion reaction with any leaked CNG, if the CNG and the inert gas get in contact with each other.

Each module has multiple PVs connected by a common manifold 67, 68. For simplicity, FIG. 1 only shows three PVs for the upper module 41 and three PVs for the lower module 42.

CNG delivery pipes 61, 62 are provided separately from the CNG supply pipes 31, 32 for each module to transfer the stored CNG to the CNG unloading facilities when required.

The CNG delivery pipes 67, 68 are each equipped with a respective pressure safety system 69, 70. Each pressure safety system comprises a pressure safety valve PSV connected to a blow-down pipe network BD. The PSVs are opened when the pressure safety systems sense that the pressure inside the modules is increasing due to leakage of CNG from the pressure vessels. The blow-down pipes BD are connected to the vent system of the ship, as discussed above.

The vent (flare) system can be a cold vent system, i.e. it might not involve a real flame. Instead, this is just a system for releasing CNG into the external environment at a relatively remote location in the air above the ship itself.

For each module, downstream of the pressure safety system and valve PSV, a depressurisation system 72, 73 is located. Like the pressure safety system, the depressurisation system is connected to the module's CNG delivery pipe 61, 62. Automatic depressurisation valves are in the depressurisation systems 72, 73. These are essentially the same as safety blow-down system 23.

It should be noted that these safety systems 23, 72, 73 also comprise a calibrated orifice FO for regulating the flow rate of dismissed CNG. This is because current norms prohibit the dismissal of uncontrolled quantities of CNG as well as to limit the velocity into the pipes.

Methanol injection by means of methanol injection systems 75, 76 is carried out for each module on the module's CNG delivery pipe 61, 62, just before shut down and control valves SDV 77, 78. These valves, together with corresponding valves located on the CNG supply pipes 31, 32 for each of the modules, serve to isolate the modules from CNG flow. Methanol injection is provided so that hydrates formation during unloading can be avoided or minimised. Methanol is known to be a good thermodynamic inhibitor against hydrates formation.

The CNG delivery pipes coming from the various modules and compartments are then connected to an unloading distribution network of pipes 85. Just like the loading distribution network of pipes 20, the unloading distribution network of pipes 85 is connected to a blow-down system 86 comprising as usual a blow-down valve, and to a blow-down pipe system BD, via a calibrated orifice FO, as shown in FIG. 1.

The unloading distribution network of pipes allows CNG to be conveyed to the CNG unloading facilities of the ship, for which see FIG. 2.

CNG is therefore loaded onto the ship from the FPSO, and stored at a predetermined temperature and pressure in the PVs on the ship.

FIG. 2 is a process flow diagram illustrating the flow of CNG during unloading operations at the K delivery point. There are three possible paths or routes for CNG to be unloaded from the ship. These three possible paths are referred to as: a) "spontaneous delivery" path; b) "spontaneous delivery with compression of the CNG transition phase" path; and c) "delivery with compression" path.

During spontaneous delivery, the nominal starting pressure in the PVs is 230 barg. The PVs' pressure tends to decrease as CNG is downloaded from the ship, and—with it—the speed of delivery of CNG decreases. Spontaneous delivery is allowed down to nominal pressures in the PVs well below the original 230 barg, down to pressures just above the delivery pressure (e.g. just above 110-120 barg). The decision whether to allow or not spontaneous delivery of CNG depends on whether it is considered that spontaneous delivery is still able to guarantee download of CNG quickly enough to be economical over the other two possible methods of delivery.

In the second regime (spontaneous delivery with compression of the transition phase), CNG is allowed to be spontaneously delivered via the same route as for case a) (spontaneous delivery). However, since the nominal starting pressure in the PVs is now approximately 126 barg, i.e. very close to the nominal pressure of the delivery point (approximately, between 110-120 barg), the CNG would be delivered at a temperature well below the required temperature of the K delivery point, which is around 10 degrees C. This would be a natural consequence of the free expansion of the CNG starting from 126 barg—at this pressure the CNG is already colder compared to the temperature of the gas at 230 barg.

Temperature compensation of CNG needs to be provided in the second regime. Furthermore, as the pressure of the CNG in the PVs approaches the equalisation point in respect of the pressure of the delivery point as CNG is still being spontaneously downloaded from the ship, speed of download also gradually decreases. This can lead to unacceptably slow delivery speed. To compensate for this effect, the so-called "transition phase" (i.e. CNG stored in the PVs at a pressure substantially equal to, or slightly below, the pressure of the delivery point) is forced through a compressor. The pressure gradient imposed by the compressor on the CNG transition phase is relatively low, and just sufficient to provide quick and economical delivery of CNG stored in the pressure vessels at pressures equal to or just below the pressure of the delivery point.

In the third regime (delivery of CNG with compression), the pressure of the remaining CNG in the PVs is substantially lower than the pressure required at the delivery point. Therefore, delivery without compression of the residual CNG would not be possible. In the third regime, therefore, CNG is unloaded from the ship by means of a compressor. CNG can be successfully and conveniently downloaded until the residual pressure of the stored CNG is around 30 barg. To download further CNG would not be economical, as the energy required to compress the residual CNG from pressures below 30 barg to approximately at least 110-120 barg would be excessive. This would go against the overarching objective of maximising the loading/unloading efficiency of the ship.

With reference to FIG. 2 (i.e. with reference to the K delivery point), the three possible paths or regimes are, in order, described below in additional detail:

a) Spontaneous Delivery

The spontaneous delivery path of the CNG during unloading is identified by stream numbers 2, 3, 8 and 9. The CNG enters in the downloading section of the ship from the top-left of FIG. 2. Lower blockage valve UV 101 is closed. Upper blockage valve UV 102 is instead open. CNG is thus admitted in the unloading section of the ship just before hot water heat exchanger 103, without having prior undergone any thermodynamic transformations.

The pressure and temperature of the CNG at stream number/section 2 are respectively 230 barg and 15 degrees C.

If the CNG was now allowed to expand (i.e. to laminate) freely, its temperature would decrease. This would take the CNG's temperature outside the temperature required at the K delivery point.

Hot water heat exchanger 103 compensates the temperature decrease in the CNG due to free lamination. The hot water heat exchanger, in the assumption that the CNG is at 230 barg and 15 degrees C. in input to the heat exchanger, provides a temperature increase to the CNG in the order of around 15 degrees C. The pressure and temperature of the CNG at stream number 3 are therefore respectively around 230 barg and 30 degrees C. It should be noted that stream number/section 4 is not part of this regime—stream section 4 is only accessed when the CNG is required to go through a compression stage.

Safety blockage valve UV 104 is provided on stream section 2 just before the heat exchanger. A further safety blockage valve UV 105 is located on stream section 3 just before the main lamination valve or main expansion valve FV 110.

The pressure downstream of the main lamination valve 110 is essentially the pressure imposed by the delivery location (taking in consideration also the pressure drop), in this case between 110-120 barg. The pressure upstream of the main lamination valve is essentially the pressure of the CNG as stored in the PVs.

Controller I 115 is responsible for regulating the opening of the main lamination valve FV 110. Values of flow and pressure are fed to the controller I, as shown in FIG. 2, by flow control unit FC 116 and pressure control unit PC 117.

Based on the actual pressure gradient between stream sections 8 (downstream of the expansion valve) and 3 (upstream of the expansion valve), the controller I 115 controls the degree of opening of the main expansion valve 110. Controller I thus operates in such a way that it ensures that the pressure of the delivered CNG is acceptable, i.e. within the required range.

Temperature control unit TC 120a is located downstream of the pressure and flow control units 116, 117, along stream section 8. The temperature control unit TC 120a feeds back information on the temperature of the CNG after lamination has taken place to a second controller 1130 which controls the supply of hot water to the hot water heat exchanger 103.

If the delivered gas is too "cold", the hot water heat exchanger 103 can provide the required temperature increase.

Since stream sections 8 and 9 are common to the three regimes, they will be described only once below, after regimes b) and c) have also been described in more detail.

b) Spontaneous Delivery with Compression of the CNG Transition Phase

The pressure in the PVs decreases as CNG is spontaneously delivered to the K delivery point at the required pressure and temperature. Spontaneous delivery is used across a rather broad range of storage pressures, for example between 130-230 barg. It will be appreciated that the range of pressures for pure spontaneous delivery can be determined according to specific design and/or application requirements.

As the pressure of incoming CNG from the CNG storage facilities of the ship decreases, the temperature of the CNG decreases. Accordingly, the hot water heat exchanger 103 provides additional heat to the circulating CNG, in order to meet the delivery temperature requirement. At a nominal pressure of 127.5 barg, the temperature gradient in the CNG across the hot water heat exchanger is around 20 degrees C. The temperature of the CNG at input to the hot water heat exchanger 103 is approximately −5 degrees C. (worst scenario). The temperature of the CNG at output from the hot water heat exchanger 103 is approximately 15 degrees C.

If the speed of transfer of CNG from the PVs to the delivery point is considered to be "too slow" and therefore not efficient, the CNG can be accelerated via compressor CP. Therefore, the CNG to exit from the hot water heat exchanger 103 can be diverted via stream section 4, through compressor inlet knock out drum 140, and finally into compressor CP 150.

The knock out drum 140 is provided simply to separate any liquid phase from the gas (water and/or other hydrated elements), so that only gas enters the compressor CP 150 (it could be damaging for the compressor CP 150 if any liquids were introduced therein).

The knock out drum 140 is connected to a liquid drainage pipe system DR, which is of the closed-drain type. Closed-drain type systems do not allow the drained liquid to be dispersed in the outer environment, such as in the sea. Instead, drained liquids are collected on the ship and delivered at the delivery or loading points for disposal.

A level valve LV 141 and a level control unit LC 142 together control the operation of the drainage of liquid into the drainage pipe system DR. The level control unit LC 142 senses the level of the accumulated liquid in the knock out drum 140.

After passing through the knock out drum 140 or alternative liquid separator, CNG is admitted in the compressor CP 150, which is driven in a conventional manner by a gas turbine TB. In the example of FIG. 2, the gas turbine TB 160 is supplied with CNG fuel gas FG directly obtained from the pressure vessels (stream 7).

The pressure of the CNG at the exit of the compressor CP 150 is sensed by a further pressure control unit PC 151. Pressure control unit PC 151 feeds that information to a further controller unit I 152. Controller unit I 152 also receives information from a further flow control unit FC 153, which monitors the flow rate of CNG from the knock out drum 140 to the compressor CP 150.

Controller 1152 then determines whether additional CNG should be drawn from stream section 6 (via a further flow valve FV 154), fed through the knock out drum 140 and then re-injected in the compressor CP 150. In other words, controller I 152 is programmed to be able to generate a feed-back loop of CNG to the compressor CP 150.

Whether the feed-back capability is used or not, is determined by the controller I 152 according to the parameters measured by the pressure control unit PC 151 and the flow control unit FC 153.

Returning now to stream section 5, i.e. the section of pipeline where CNG outputted from the compressor CP 150 flows, a shut down and control valve system SDV 155 comprising a fail-close valve is provided downstream of the point where pressure control unit PC 151 reads the pressure of the CNG out of the compressor CP 150.

Proceeding along the path of the CNG, we come to stream section 6, which is characterised by the presence of a compressed CNG heat exchanger 170a. In the case of transition CNG (or transition phase CNG—i.e. CNG at pressures substantially equal to the delivery pressure), minimal or no heat is exchanged at this heat exchanger 170a. This is because the temperature of the CNG has already been brought to the appropriate level by the hot water heat exchanger 103. It should be remembered that the compressor 150 is responsible for heating the CNG even further. CNG heat exchanger 170a is also referred to as first stage compressor after cooler. This is because its function is to cool the to-be-unloaded CNG if necessary.

A further sea water heat exchanger 180 is then provided along stream section 6, after the first stage compressor after cooler 170a. This latter heat exchanger, also known as gas export cooler 180, allows the CNG to be cooled to an appropriate temperature just prior to delivery. Sea water SW is drawn directly from the sea as a coolant liquid and re-circulated in the sea after use.

Operation of the sea water cooler 180 is controlled by temperature control unit TC 190 and temperature control valve TV 191 as shown in FIG. 2, bottom left of diagram.

A blockage valve UV 192 is also provided on stream section 6 downstream of the sea water cooler 180.

In this second regime, "spontaneous" and "transition phase" CNG (i.e. CNG stored on the ship at pressures close or equal to the delivery pressure) are delivered at the required pressure and temperature at the K delivery point.

c) Delivery with Compression

Stage b) above allows delivery of stored CNG having pressures relatively close or equal to the delivery pressure. As we have seen, the CNG is allowed through a relatively complex system involving heat exchangers, coolers and compressors to achieve the required delivery characteristics.

The present stage deals with delivery of CNG stored on the ship at pressures substantially below the delivery pressure, e.g. 50 barg. At 50 barg, a PVs is relatively empty.

Stage c) implements essentially a scavenging process in respect of this remaining CNG. The minimum pressure of stored CNG that can be conveniently downloaded from the ship is around 30 barg. It is not convenient to empty completely the pressure vessels. Residual CNG is carried on the ship all the way back to the CNG production and collection point, or used in the ship as fuel.

In the present regime, CNG is admitted into the diagram of FIG. 2 from the top left corner as usual. However, upper blockage valve UV 102 is now closed and lower blockage valve 101 is open, so that stream section 1 is now used.

Stream section 1 is characterised by the presence of the CNG heat exchanger 170a. This exchanger has been described in more detail above. This means that low pressure ("cold") CNG is initially heated up using compression residual heat. This pre-heating step is now necessary in view of the very low pressures and temperatures of the CNG inputted to the downloading facilities. The compressor CP 150 is now required to compress the CNG to pressures (and, therefore, temperatures) suitable to ensure correct functioning of the pre-heater 170a.

After the pre-heating step, the CNG is then routed, in order, through stream sections 2, 4, 5 and 6 exactly as for regime b) above. The pressure gradient established by compressor CP 150 will be, however, greater than in the previous regime, where part of the motive force of the CNG was already stored in the CNG in arrival from the loading facilities (higher pressures). Now, the incoming CNG is at much lower pressures.

For a detailed description of CNG streams 2, 4, 5 and 6 see regime b) above.

It should be noted that the feedback loop established by the controller 1152 in conjunction with pressure control unit PC 151, flow control unit FC 153 and flow valve FV 154 operating between stream sections 6 and 4 will be useful in successfully managing transition regimes between delivery according to regimes b) and c). When the delivery method is switched from b) to c), at early stages the CNG may not yet be ready for delivery, because its pressure and temperature are not yet within the delivery range. If so, the CNG can be re-injected in the compressor CP 150 until satisfactory pressures and temperatures at the output thereof are measured.

CNG coming simultaneously via one or more of the above described delivery regimes is then collected at stream section 7 at substantially the delivery pressure and temperature. A High Integrity Pipeline Protection System HIPPS 199 is provided along stream section 7. The HIPPS 199 comprises a system of close-fail valves C. A shut down and control valve system SDV 198 is also provided downstream of the HIPPS 199. The function of the HIPPS is that of protecting the delivery PLEM system 200 from possible overpressures. PLEMs can be relatively delicate, as they are designed accurately to measure physical and chemical quantities of the delivered CNG.

It is then downstream of "protected" stream section 8 that the CNG leaves the ship via stream section 9. Stream section 9 is implemented by means of a flexible mechanical connection 201. The delivery PLEM system can be provided on a floating structure. From the delivery PLEM system 200, the CNG is routed to onshore facilities.

In the above-described examples, the compressor CP is a 12 MW unit compressor.

In the loading phase, as said above, CNG is admitted on the ship at about 230 barg and 15 degrees C.

In the spontaneous delivery regime, the CNG entering the CNG unloading facilities is first heated by hot water heat exchanger 103 to about 30 degrees C. as an example. After lamination, the gas is delivered for example at about 128 barg and 13 degrees C.

In the spontaneous delivery regime with compression of the transition phase of the CNG, the CNG entering the CNG unloading facilities is, in an example, at about 127 barg and −5 degrees C. The CNG is then pre-heated in pre-heater 103, to about 14 degrees.

No further significant thermodynamic events are undergone by the CNG before delivery. The latter conditions are therefore the conditions approximately at which the CNG is delivered.

In the delivery with compression regime, the CNG, in one example, enters the CNG unloading facilities at about 31 barg and −57 degrees C. After pre-heating in the first stage compression after cooler 170a, or after pre-heating in that cooler plus further heating in the hot water heat exchanger 103, the CNG's temperature is about 40 degrees C.

After compression, the pressure of the CNG is about 127 barg and the temperature about 162 degrees C.

After heat has been transferred by the CNG to fresh oncoming CNG at the first stage compressor after cooler, the temperature of the CNG decreases, in the example, to about 36 degrees C.

After the further cooling stage at the gas export cooler, the temperature falls to about 14 degrees C. The CNG is therefore delivered at around 127 barg and 14 degrees C.

FIG. 3 shows an example of a layout of CNG management facilities onboard of a ship. Gas compression unit 360 is located on the aft of the ship, on the upper deck. The gas compression unit 360 is also commonly referred to as the "scavenging unit". This is because its function is the recovery of CNG stored in the ship, which would not otherwise be possible to download. In FIG. 3, gas compression unit 360 can be seen to comprise three scavenging compressor trains 362, each including a gas turbine and a centrifugal gas compressor. Respective gas turbine oil coolers 363 are also provided adjacent each of the scavenging compressor trains 362. A gas metering module 365 is also part of the gas compression unit 360.

As explained above in connection with FIG. 2, the gas metering module comprises a pressure control unit PC and a flow control unit FC. A controller I is also provided in connection with the pressure and flow control units so that CNG can be fed back to the compressor if necessary, as explained above for FIG. 2.

A number of gas cooling units 366, including gas compressor after coolers and gas export coolers, are also provided as part of the gas compression unit 360, so that the CNG can be delivered at the required temperature, again as explained above for FIG. 2.

For each scavenging compressor train, a knock out drum 367 is provided as part of the gas compression unit 360.

The PVs are hosted in the hold of the ship, and are therefore not visible in FIG. 3. All accessory or secondary units are located on the deck, towards the forepart of the ship. These secondary units are: a fuel gas unit 420, which powers the gas turbines; a main electric power generation unit 470 that serves the whole ship; a chemical injection unit 120a, which is used to inject a chemical hydrates inhibitor into the CNG, namely methanol, when necessary; an inert gas unit 600, which is used to control the atmosphere in each sealed compartment containing PVs; a compressed air unit 460, which is necessary for the functioning of the scavenging gas turbines; a flare, vent and blow-down unit 230, connected with the various blow down pipes and systems on the ship—this unit also hosts a knock out drum; an emergency electric power generation unit 480; a diesel fuel unit 430, which powers the engines of the boat; a sea water unit 500 that is responsible for the provision of sea water to the sea water coolers (gas export coolers); a closed drain unit 550, which is emptied of its liquids at the delivery or loading locations; a hot water unit 410 that supplies the hot water heat exchangers; and a gas separation unit 300.

It seems optimal to reserve the aft of the ship for process units, whilst the fore is reserved for utilities.

FIG. 4 summarises the relevant CNG management operations in connection with the operations of loading and, more importantly, unloading of CNG to and from the ship for the K delivery point case study.

Compressed Natural gas NG is first loaded from the FPSO onto the CNG carrying ship via loading and unloading system 170 (also referred to as gas sealine system). The gas is then stored in the gas storage system 361, which comprises storage pressure vessels.

During spontaneous delivery, CNG is transferred from the PVs to a gas heating system 300, so that when the gas laminates it will still be delivered at the required temperature (thick solid line in FIG. 4). The NG is then transferred back to the loading and unloading system 170 (thin solid line to the right of unit 300 in FIG. 4), this time for unloading purposes, and from it to onshore facilities.

During delivery with compression (regimes b) and c) above), the NG is first transferred from the PVs to a gas compression system 360 comprising pre-heaters, compressors and coolers, as described in FIG. 2. In the gas compression system 360, preliminary heating of CNG takes place (only for regime c)). The CNG is then heated and compressed according to upper loop 700 (see upper loop of thick dashed lines in FIG. 4). Before the CNG is delivered, however, the CNG is transferred according to lower path 800 (see lower path of thick dashed lines in FIG. 4) to bring the temperature of the CNG in line with the delivery point requirements. Lower path 800 involves cooling of the CNG through a gas export cooler unit 360.

In addition, FIG. 4 shows the relationship between the above mentioned key units, part of the gas compression system 360, and the various secondary or utility units, such as the blow down system 230, the inert gas system 600, the methanol injection system 120, the closed drain system 550, the hot water system 410, the sea water system 500 and the fuel gas system 400.

FIG. 5 is equivalent to FIG. 2 and it is for the B delivery point. The B delivery point accepts CNG at higher temperatures, in the order of 20 degrees C.

The final step during regimes b) and c) of cooling the CNG down to meet the delivery point required temperature is therefore now superfluous, and consequently the gas export cooler is not present in FIG. 5.

FIG. 6 is equivalent to FIG. 3 and it is for the B delivery point. The layout of FIG. 6 only differs with the layout of FIG. 3 for the absence of the two gas export coolers 366, part of the gas compression unit 360 in FIG. 3. As a result, the ship is also slightly differently dimensioned compared to the ship of FIG. 3.

FIG. 7 is equivalent to FIG. 4 and it is for the B delivery point. The block flow diagram of FIG. 7 only differs in comparison with the block flow diagram of FIG. 4 for the absence of the gas export cooling unit.

While FIGS. 5, 6 and 7 are only minimally different to FIGS. 2, 3 and 4, they demonstrate that systems according to the present invention can be tailored to specific applications. Such modifications will be generally dictated by the difference between the values of the pressure and temperature of the CNG at the loading location, and by the values of pressure and temperature required for the delivered CNG at the delivery location.

The pressure vessels have been disclosed to be for CNG, but it might be for carrying a variety of gases, such as raw gas straight from a bore well, including raw natural gas, e.g. when compressed—raw CNG or RCNG, or H2, or CO2 or processed natural gas (methane), or raw or part processed natural gas, e.g. with CO2 allowances of up to 14% molar, H2S allowances of up to 1,000 ppm, or H2 and CO2 gas impurities, or other impurities or corrosive species. The preferred use, however, is CNG transportation, be that raw CNG, part processed CNG or clean CNG—processed to a standard deliverable to the end user, e.g. commercial, industrial or residential.

CNG can include various potential component parts in a variable mixture of ratios, some in their gas phase and others in a liquid phase, or a mix of both. Those component parts will typically comprise one or more of the following compounds: C2H6, C3H8, C4H10, C5H12, C6H14, C7H16, C8H18, C9+ hydrocarbons, CO2 and H2S, plus potentially toluene, diesel and octane in a liquid state, and other impurities/species.

The present invention has been described above purely by way of example. Modifications in detail may be made to the present invention within the scope of the claims appended hereto.

The invention claimed is:

1. A system for loading and storing CNG on board a ship and for unloading it therefrom, the system being situated on the ship and comprising:
    CNG loading facilities for loading CNG on board the ship;
    CNG storage facilities for storing the loaded CNG on board the ship at storage pressures and temperatures; and
    CNG unloading facilities for unloading the stored CNG to a delivery point, the delivery point requiring the stored CNG to be unloaded at delivery pressures and temperatures generally different from the storage pressures and temperatures, the CNG unloading facilities comprising:
    a CNG heater for heating to-be-unloaded CNG prior to unloading;
    a lamination valve for allowing the to-be-unloaded CNG to expand from the storage pressure to the delivery pressure prior to unloading;
    a compressor unit for compressing the to-be-unloaded CNG downstream of the CNG storage facilities prior to unloading;
    a compressor pressure control unit located downstream of the compressor unit;
    a separator unit located downstream of the CNG heater and upstream of the compressor unit;
    a separator flow control unit located downstream of the separator unit for separating liquid from CNG and upstream of the compressor unit;
    a feedback flow valve located downstream of the compressor pressure control unit; and
    a compressor controller programmed for operating the feedback flow valve so that unloaded CNG can be re-injected into the compressor unit before it is unloaded by the CNG unloading facilities,
    wherein the separator flow control unit and the compressor pressure control unit are each configured to provide information to the compressor controller.

2. A system in accordance with claim 1, wherein the CNG heater is a hot water heater.

3. A system in accordance with claim 2, further comprising a temperature control valve, wherein the CNG heater is configured for being controlled by the temperature control valve.

4. A system in accordance with claim 3, further comprising a temperature controller and a temperature control unit, wherein the temperature control valve is configured for being controlled by the temperature controller, which is configured for elaborating information provided to it by the temperature control unit.

5. A system in accordance with claim 1, wherein the opening of the lamination valve is continuously variable within an interval between a maximum value and a minimum value of the opening.

6. A system in accordance with claim 5, further comprising a lamination valve controller, wherein the lamination valve is configured for being controlled by the lamination valve controller.

7. A system in accordance with claim 6, further comprising a lamination pressure control unit, wherein the lamination valve controller is configured for elaborating information provided to it by the lamination pressure control unit.

8. A system in accordance with claim 6, further comprising a lamination flow control unit, wherein the lamination valve controller is configured for elaborating information provided to it by the lamination flow control unit.

9. A system in accordance with claim 1, further comprising a fuel supply unit, wherein the compressor unit is driven by a gas turbine unit and the gas turbine unit is supplied by the fuel supply unit, and wherein the fuel supply unit is configured for receiving CNG as fuel, the CNG fuel being a portion of the CNG stored on board of the ship.

10. A system in accordance with claim 1, wherein the CNG unloading facilities further comprise a compressor unit after cooler, the compressor unit after cooler being located downstream of the compressor unit and being configured for heat to be transferred from the compressed CNG to CNG being transferred from the CNG storage facilities to the CNG unloading facilities.

11. A system in accordance with claim 10, wherein the CNG unloading facilities further comprise a gas export cooler, the gas export cooler being located downstream of the compressor unit after cooler.

12. A system in accordance with claim 1, wherein the compressor unit is designed for providing a maximum pressure gradient of approximately 90 barg or in excess of 90 barg.

13. A CNG carrier ship comprising a system in accordance with claim 1.

14. A system in accordance with claim 1, wherein the compressor unit is driven by electricity or a gas turbine unit.

15. A system in accordance with claim 1, wherein the separator unit is a knock out drum.

16. A system in accordance with claim 15, further comprising a level sensor, wherein the separator unit is connected to the level sensor, and the level sensor is configured for sensing liquid level inside the separator unit.

17. A system in accordance with claim 16, wherein the level sensor is operably connected to a liquid drainage valve, and the liquid drainage valve is configured for draining the liquid from the separator into a drainage system.

18. A system in accordance with claim 1, further comprising a blow down unit for allowing CNG to be ejected from the system.

19. A system situated on a ship for loading and storing CNG on board the ship and for unloading it therefrom, the system comprising:
   CNG loading facilities for loading CNG on board the ship;
   CNG storage facilities for storing the loaded CNG on board the ship; and
   CNG unloading facilities for unloading the stored CNG to a delivery point, the CNG unloading facilities comprising:
      a CNG heater for heating to-be-unloaded CNG;
      a compressor unit for compressing the to-be-unloaded CNG downstream of the CNG storage facilities;
      a compressor pressure control unit located downstream of the compressor unit;
      a separator unit for separating liquid from CNG, the separator unit located downstream of the CNG heater and upstream of the compressor unit;
      a separator flow control unit for controlling the separator unit, the separator flow control unit located downstream of the separator unit and upstream of the compressor unit;
      a feedback flow valve located downstream of the compressor pressure control unit; and
      a compressor controller programmed for operating the feedback flow valve to re-inject the to-be-unloaded CNG into the compressor unit before it is unloaded by the CNG unloading facilities, wherein the separator flow control unit and the compressor pressure control unit are each configured to provide information to the compressor controller.

20. A system in accordance with claim 19, wherein the CNG heater is a hot water heater.

21. A system in accordance with claim 20, further comprising a temperature control valve, wherein the CNG heater is configured to be controlled by the temperature control valve.

22. A system in accordance with claim 21, further comprising a temperature controller and a temperature control unit, wherein the temperature control valve is configured to be controlled by the temperature controller.

23. A system in accordance with claim 19, further comprising a lamination valve configured to allow the to-be-unloaded CNG to expand from a storage pressure to a delivery pressure prior to unloading, wherein opening of the lamination valve is continuously variable between a maximum value and a minimum value of the opening.

* * * * *